Jan. 27, 1953

G. C. TREMBLY 2,627,025

SWEEP GENERATOR

Filed April 18, 1946

INVENTOR
GRAY C. TREMBLY
BY
*M. S. Hayes*
ATTORNEY

Patented Jan. 27, 1953

2,627,025

UNITED STATES PATENT OFFICE 2,627,025

SWEEP GENERATOR

Gray C. Trembly, Cambridge, Mass., assignor, by mesne assignments, to the United States of America as represented by the Secretary of the Navy Application April 18, 1946, Serial No. 662,981

9 Claims. (Cl. 250—27)

1

This invention relates to transitron type sweep generators and more particularly to improvements in the triggering of such sweep generators.

In cathode ray oscilloscopes, pulse analyzers, and various types of equipment used in the electronic art employing cathode ray tubes, frequent use has been made of transitron type generators for producing sweeps and time bases. Certain difficulties arise however when the triggering pulse to the transitron tube is applied on its control grid. First non-linearity of the sweep especially at fast speeds is caused by the loading effect of the trigger source upon the grid circuit. Second variation of amplitude of the triggering pulse is necessary as the sweep speed changes in order to obtain optimum performance. And third in pulse analyzers when the voltage wave developed on the suppressor grid of the transitron tube is used to intensify the cathode ray tube, the intensity of the cathode ray tube will not increase rapidly enough.

Accordingly it is an object of this invention to eliminate grid circuit loading and thereby obtain a linear sweep voltage, particularly at fast sweep speeds, from a transitron type sweep generator.

Another object is to eliminate the necessity for varying the amplitude of the trigger pulse to a transitron sweep generator as sweep speed is changed.

A further object is to obtain a cathode ray tube intensity gate from a transitron sweep generator whose leading edge is steep enough to eliminate delay in the intensifying of the cathode ray tube.

To accomplish these objects and other objects which hereinafter appear, this invention resides in the circuit elements and their relation one to another as are more particularly described in the following specification. The specification is accompanied by drawings in which.

Figure 1:
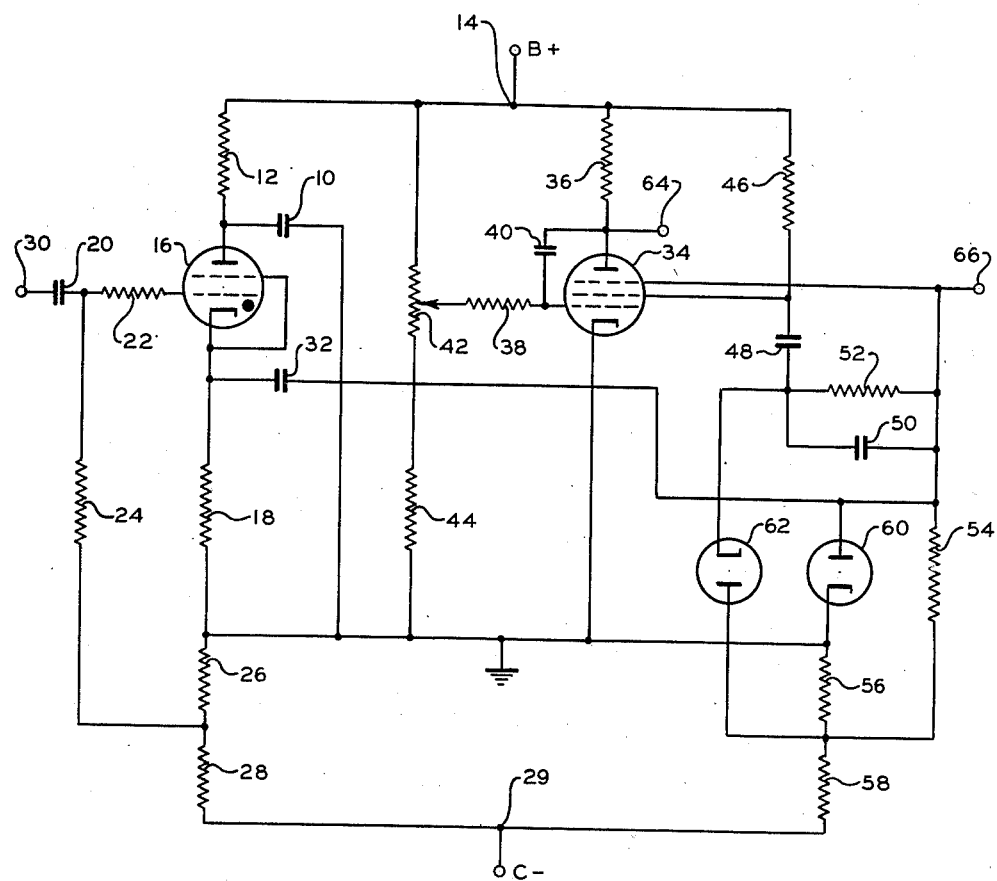
Fig. 1 is a schematic diagram of a transitron sweep generator and associated circuits.

Referring to Fig. 1, a storage condenser 10 and a charging resistor 12 are connected in series between a high voltage supply at 14 and ground. In parallel with condenser 10, a gas tube 16 and cathode resistor 18 are connected to ground. To the control grid of gas tube 16, an input circuit is connected, composed of coupling condenser 20, limiting resistor 22, grid return resistor 24, grid biasing resistors 26 and 28 connected to grid biasing supply at 29, and input terminal 30. By means of peaking condenser 32, the cathode of gas tube 16 is coupled to the suppressor grid of high vacuum pentode 34.

A transitron sweep generator circuit is associated with the above described pulsing circuit. In such a transitron sweep generator circuit the pentode 34 is connected as shown with plate resistor 36, control-grid return resistor 38, plate to control-grid coupling condenser 40, control grid biasing resistors 42 and 44, screen-grid dropping resistor 46, screen to suppressor coupling condensers 48 and 50, screen to suppressor coupling resistor 52, suppressor-grid return resistor 54, suppressor-grid biasing resistors 56 and 58, and limiting diodes 60 and 62 to produce outputs at terminals 64 and 66.

Figure 2:
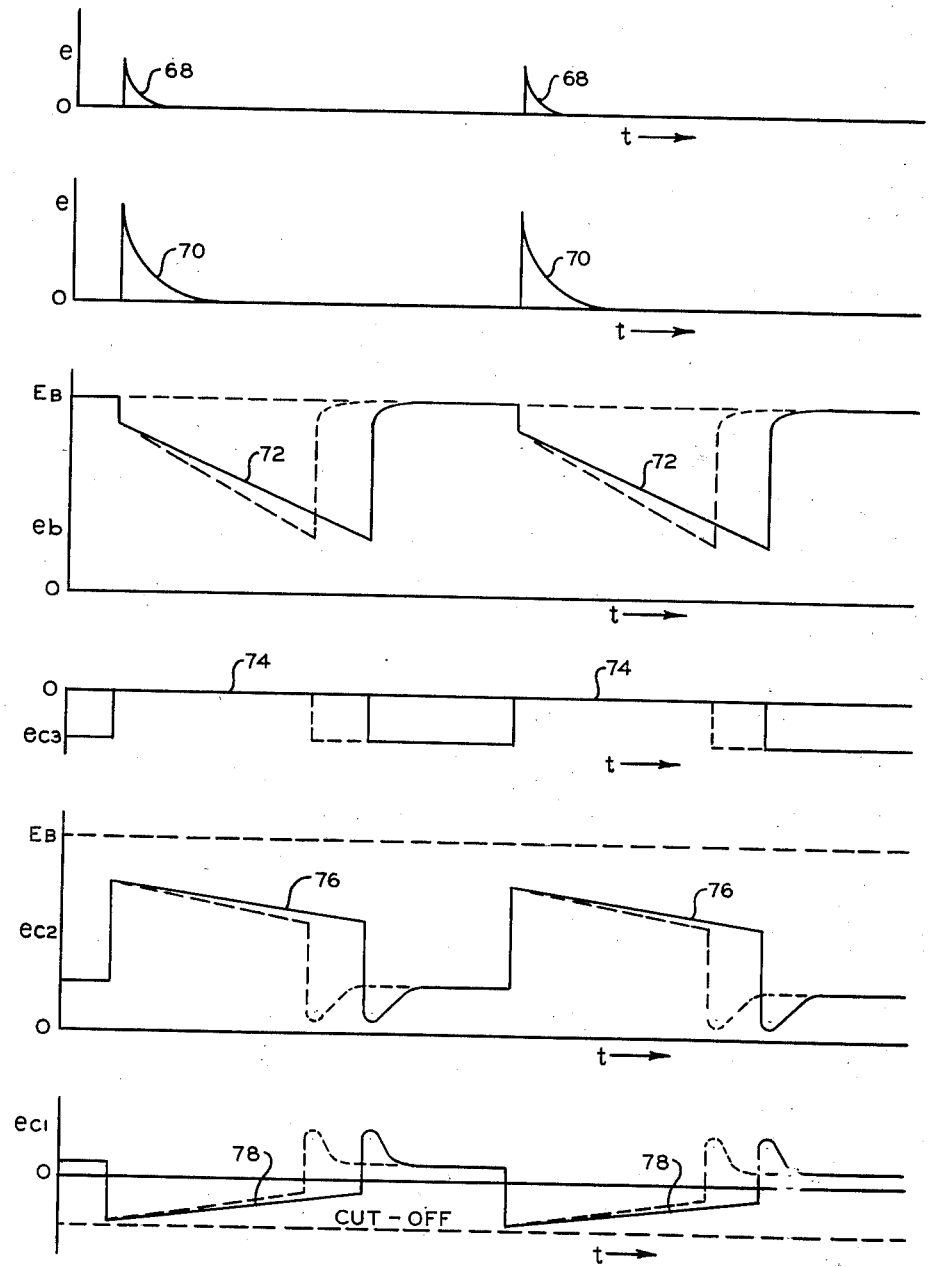
Fig. 2 is a series of wave forms showing the development of the sweep in the circuits of Fig. 1.

Referring to Fig. 2, a positive trigger pulse 68, applied to input terminal 30, of sufficient amplitude to drive the control grid of gas tube 16 positive, will cause the gas tube 16 to ignite and discharge storage condenser 10, previously charged from high voltage source at 14, through cathode resistor 18, thereby developing a high positive voltage pulse 70 across resistor 18. By means of peaking condenser 32, voltage pulse 70 is sharpened and applied to the suppressor grid of high vacuum pentode 34.

In the steady state the control grid of pentode 34 is drawing current through control-grid return resistor 38, since it is returned to a positive voltage determined by the adjustment of control-grid biasing resistor 42. The pentode will therefore be conducting strongly through its screen grid. At the same time the suppressor grid of pentode 34 is at a negative voltage determined by the relative sizes of the suppressor-grid biasing resistors 56 and 58, connected between grid biasing supply at 29 and ground and all of the conduction through the pentode will be from screen-grid to cathode. The plate of the pentode will therefore be at B+, the voltage of the high voltage supply at 14, and the screen grid will be at some lower voltage.

Figure 3:
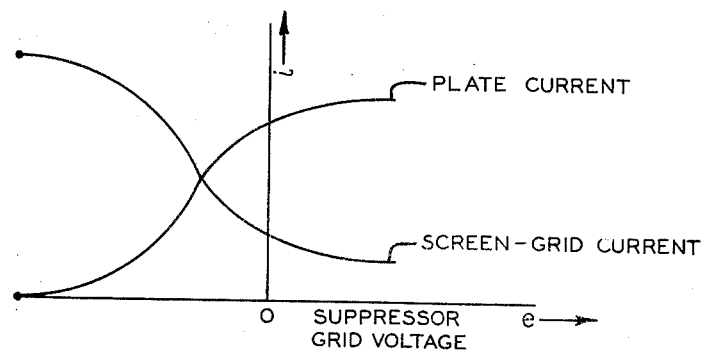
Fig. 3 is a plot showing the characteristics of a high vacuum pentode.

When the positive voltage pulse 70 hits the suppressor grid, it will be driven to ground potential. This will shift conduction in the pentode from screen to plate, as may be seen from Fig. 3 in which plate current and screen current are plotted against suppressor voltage, and in result, the screen voltage will rise suddenly to a higher voltage as shown at 76 in Fig. 2. Because of the coupling between screen and suppressor by means of condensers 48 and 50 and resistor 52, the limiting action of diode 60, and the slow charging rate of coupling condensers 48 and 50 through suppressor-grid return resistor 54, the suppressor will be held at ground potential and the screen near B+ until the screen can again conduct heavily.

As soon as the plate starts to conduct, the accompanying decrease in plate voltage is reflected to the control grid through plate to control-grid coupling condenser 40. The grid voltage is forced down, as shown at 78 in Fig. 2, until it reaches the value near cutoff necessary to support the plate current already flowing. At this point a degenerative action starts which produces a linear sweep. The fall of plate voltage from this point on is controlled by the discharge rate of coupling condenser 40. If the plate voltage were to drop faster than coupling condenser 40 could discharge, it would push the control grid nearer to cutoff and reduce the plate current, thus slowing the plate down, and if the plate voltage were to drop slower than condenser 40 discharges, the control grid would rise, increasing plate current and causing the plate to drop faster. The control grid is negative with respect to the cathode so no grid current flows and the only way coupling condenser 40 can discharge is through control-grid return resistor 38. One end of this resistor is connected to the grid, which is always between cutoff and ground potential during the sweep, and the other end is connected to the arm of control-grid biasing resistor 42 which is at a relatively high positive potential. As a result of the difference in voltage between the two ends of resistor 38, current flows and discharges condenser 40, allowing the plate voltage to drop. Since the voltage across the resistor 38 is essentially constant, the current flow through it and from condenser 40 is constant. This means that the voltage change across the capacitor is linear, and accordingly the sweep voltage produced on the plate of pentode 34 and at terminal 64 is linear.

The degenerative action continues until the plate current has reached a certain limiting value, at which point the screen current starts to increase rapidly. This pulls the screen and suppressor voltage down and reduces plate current. The plate starts to rise, pulling the grid up, and increasing screen current still more. The grid quickly goes positive, plate current is cutoff, and grid current recharges condenser 40, allowing the plate to rise to high voltage again. The screen drops to its former low value, and the charge that had accumulated on screen grid to suppressor grid coupling condensers 48 and 50 is quickly removed by conduction of limiting diode 62 returning the suppressor to its initial negative voltage. The pentode 34 is now back to its steady state condition. The sweep voltage 72 produced at terminal 64 by the plate voltage variation ($e_b$) of pentode 34, the cathode ray tube intensity gate 74 produced at terminal 66 by the suppressor-grid voltage variation ($e_{c3}$), the screen-grid voltage variation ($e_{c2}$), and the control-grid voltage variation ($e_{c1}$) are shown in Fig. 2. If the adjustment of control-grid biasing resistor 42 is changed to raise the control-grid bias, the discharge rate of condenser 40 will increase, and the sweep speed will correspondingly increase. This is shown in Fig. 2 by the dotted wave forms, from which it is evident that the sweep speed may be varied over a considerable range merely by varying the control grid bias voltage. Also it is obvious that this range may be extended considerably by providing means for changing the capacity of coupling condenser 40. The amplitude of the sweep which is dependent mainly upon tube characteristics will remain essentially constant, and linearity of the sweep which is determined mainly by the potential difference across control-grid return resistor 38, will be good over the entire range of sweep speeds, provided the control grid bias is not made too small relative to the control grid voltage during the sweep.

The sharp rise and fall of the cathode ray tube intensity gate 74 results from the limiting action of diodes 60 and 62, and in particular the steep leading edges results from the application of trigger pulse 70 to the suppressor grid of pentode 34. In conventional transitron type sweep generators in which the trigger pulse is applied to the control grid of the pentode, the leading edge of the intensity gate is sloped to some extent and in consequence does not intensify the cathode ray tube as quickly as does the intensity gate produced by this invention. The value of this becomes evident in the design of pulse analyzers for radar transmitter in which the trigger pulse to the analyzer is developed from the transmitted pulse.

The invention described in the foregoing specification need not be limited to the details shown, which are considered to be illustrative of one form the invention may take.

What is claimed is:

1. In a transitron type sweep generator including a pentode, a pulse amplifier including a gas tube, responsive to externally developed positive synchronizing pulses applied to the control grid of said gas tube, for producing positive trigger pulses at its output, and means for coupling said positive trigger pulses from said pulse amplifier to the suppressor grid of said pentode.

2. In a transitron type sweep generator including a pentode having its suppressor grid biased to a predetermined value negative with respect to the cathode, a gas tube, a storage condenser in series with the plate to cathode circuit of said gas tube, a resistor in the cathode circuit of said gas tube, a circuit joining one side of said resistor with said suppressor grid whereby triggering of the grid of said gas tube will produce a voltage across said resistor to be applied to said suppressor grid to trigger said pentode.

3. In a transitron type sweep generator including a pentode, a plate resistor, a screen-grid dropping resistor, a control-grid return resistor, a control-grid biasing means, a suppressor-grid return resistor, a suppressor-grid biasing means associated with said pentode, a high voltage power source connected to the plate of said pentode through said plate resistor, coupling means between plate and control grid of said pentode, and coupling means between screen grid and suppresor grid of said pentode, a gas tube, a storage condenser in series with the plate to cathode circuit of said gas tube, a charging resistor for said storage condenser, a grid input circuit connected to the control grid of said gas tube, a cathode resistor connected to the cathode of said gas tube, a peaking condenser joining one side of said cathode resistor with the suppressor grid of said pentode whereby application of a synchronizing pulse to said grid input circuit will cause the voltage developed across said cathode resistor to trigger said pentode.

4. The combination of a pentode tube connected as a transitron type sweep generator having a steady positive bias applied to the control grid thereof, with a gas tube isolating amplifier and means for coupling trigger pulses to the suppressor grid of said pentode from said isolating amplifier, said means including limiting diodes and a differentiating capacitor for sharpening said trigger pulses.

5. Apparatus as in claim 4 wherein the plate of said pentode is coupled by means of a capacitor to said grid to induce a degenerative action resulting in a linear voltage discharge by said capacitor.

6. In a transitron type sweep generator including a pentode biased for conduction through its screen grid circuit, a source of synchronizing trigger voltage pulses, a pulse amplifier responsive to pulses from said source for producing positive voltage pulses, and means for applying said positive voltage pulses to the suppressor grid of said pentode to shift conduction to the plate circuit thereof.

7. In a transitron type sweep generator including a pentode having its control grid biased to a positive potential and its suppressor grid biased to a negative potential for space current conduction through its screen grid circuit, a source of synchronizing trigger voltage pulses, a pulse amplifier responsive to pulses from said source for producing positive voltage pulses and means for applying said positive voltage pulses to the suppressor grid of said pentode to shift conduction to the plate circuit thereof.

8. In a transitron type sweep generator including a pentode having its control grid biased to a positive potential and its suppressor grid biased to a negative potential for space current conduction through its screen grid circuit, a source of synchronizing trigger voltage pulses, a gas tube isolating pulse amplifier responsive to pulses from said source for producing positive voltage pulses and means for applying said positive voltage pulses from said isolating amplifier to the suppressor grid of said pentode to shift conduction to the plate circuit thereof, said means including a differentiating network for sharpening said trigger pulses.

9. In a transitron type sweep generator including a pentode having its control grid biased to a positive potential and its suppressor grid biased to a negative potential for space current conduction through its screen grid circuit, a source of synchronizing trigger voltage pulses, a gas tube isolating pulse amplifier responsive to pulses from said source for producing positive voltage pulses, means for applying said positive voltage pulses from said isolating amplifier to the suppressor grid of said pentode to shift conduction to the plate circuit thereof, said means including a differentiating network for sharpening said trigger pulses, and a diode limiter circuit for deriving a rectangular voltage wave at the suppressor grid of said pentode.

GRAY C. TREMBLY.

REFERENCES CITED

The following references are of record in the file of this patent:

UNITED STATES PATENTS

| Number | Name | Date |
| --- | --- | --- |
| 2,049,376 | Hertwig et al. | July 28, 1936 |
| 2,265,290 | Knick | Dec. 9, 1941 |

OTHER REFERENCES

Ultra-High-Frequency Techniques, by Brainerd et al., pages 170, 171, 181, 182, 183, published by D. V. Nostrand Co., Inc.,